United States Patent
Rubinstein et al.

(10) Patent No.: US 11,487,769 B2
(45) Date of Patent: Nov. 1, 2022

(54) ARRANGING STORIES ON NEWSFEEDS BASED ON EXPECTED VALUE SCORING ON A SOCIAL NETWORKING SYSTEM

(71) Applicant: Meta Platforms, Inc., Menlo Park, CA (US)

(72) Inventors: Yigal Dan Rubinstein, Los Altos, CA (US); David Vickrey, Mountain View, CA (US); Robert William Cathcart, San Francisco, CA (US); Lars Seren Backstrom, San Francisco, CA (US); Romain Jean Thibaux, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 921 days.

(21) Appl. No.: 15/067,134

(22) Filed: Mar. 10, 2016

(65) Prior Publication Data

US 2016/0188607 A1 Jun. 30, 2016

Related U.S. Application Data

(63) Continuation of application No. 13/715,999, filed on Dec. 14, 2012, now Pat. No. 9,378,529.

(51) Int. Cl.
*G06F 16/2457* (2019.01)
*G06F 16/9535* (2019.01)
(Continued)

(52) U.S. Cl.
CPC .... *G06F 16/24578* (2019.01); *G06F 16/9535* (2019.01); *G06Q 50/01* (2013.01); *G06F 40/166* (2020.01)

(58) Field of Classification Search
CPC ........... G06F 17/3053; G06F 17/30867; G06F 16/24578; G06F 16/9535; G06F 40/166; G06Q 50/01
(Continued)

(56) References Cited

U.S. PATENT DOCUMENTS

| | | | | |
|---|---|---|---|---|
| 2 A | * | 7/1836 | Goulding | D06C 3/00 57/58.49 |
| 1,344,506 A | * | 6/1920 | Gunn | B65D 85/1036 493/167 |

(Continued)

OTHER PUBLICATIONS

United States Office Action, U.S. Appl. No. 13/715,999, filed May 8, 2015, 22 pages.
(Continued)

*Primary Examiner* — Ashish Thomas
*Assistant Examiner* — Nargis Sultana
(74) *Attorney, Agent, or Firm* — Fenwick & West LLP

(57) ABSTRACT

A social networking system generates a newsfeed for a user to view when accessing the social networking system. Candidate stories associated with users of the social networking system are selected and an expected value score for each candidate story is determined. An expected value score is based on the probability of a user performing various types of interactions with a candidate story and a numerical value for each type of interaction. The numerical value for a type of interaction represents a value to the social networking system of the type of interaction. Based on the expected value scores, the candidate stories are ranked and the ranking used to select candidate stories for the newsfeed.

20 Claims, 5 Drawing Sheets

(51) Int. Cl.
  *G06Q 50/00* (2012.01)
  *G06F 40/166* (2020.01)
(58) Field of Classification Search
  USPC ........................................................ 707/748
  See application file for complete search history.

(56) References Cited

U.S. PATENT DOCUMENTS

| | | | |
|---|---|---|---|
| 7,209,906 B2 | 4/2007 | Goodwin et al. | |
| 8,301,623 B2* | 10/2012 | Chakrabarti | G06Q 30/02 707/723 |
| 8,543,454 B2* | 9/2013 | Fleischman | H04N 21/23418 705/14.44 |
| 8,606,792 B1* | 12/2013 | Jackson | H04L 67/306 707/748 |
| 8,793,255 B1* | 7/2014 | Bilinski | G06N 20/00 707/740 |
| 8,903,909 B1* | 12/2014 | Marra | G06Q 50/01 709/200 |
| 9,015,084 B2 | 4/2015 | Thieberger et al. | |
| 9,177,029 B1* | 11/2015 | Chau | G06F 17/30867 |
| 9,208,251 B2* | 12/2015 | Mawhinney | G06F 16/9535 |
| 10,078,819 B2* | 9/2018 | Bonforte | G06F 3/0481 |
| 2003/0135606 A1* | 7/2003 | Goodwin | G06Q 50/01 709/224 |
| 2005/0065909 A1* | 3/2005 | Musgrove | G06Q 30/0277 |
| 2007/0156664 A1* | 7/2007 | Norton | A63F 13/798 |
| 2008/0040474 A1* | 2/2008 | Zuckerberg | H04L 65/601 709/224 |
| 2008/0070697 A1* | 3/2008 | Robinson | A63F 13/12 463/42 |
| 2008/0168117 A1* | 7/2008 | Coates | G06F 17/30867 709/201 |
| 2008/0209320 A1* | 8/2008 | Mawhinney | G06F 16/248 715/700 |
| 2009/0119167 A1* | 5/2009 | Kendall | G06Q 30/0255 705/14.17 |
| 2009/0138304 A1* | 5/2009 | Aharoni | G06Q 30/0225 705/7.33 |
| 2009/0235335 A1* | 9/2009 | Mendiola | H04L 63/104 726/4 |
| 2009/0319466 A1* | 12/2009 | Liu | G06Q 10/10 706/54 |
| 2010/0049534 A1* | 2/2010 | Whitnah | G06Q 30/02 705/319 |
| 2010/0049852 A1* | 2/2010 | Whitnah | H04L 47/783 709/226 |
| 2010/0062840 A1* | 3/2010 | Herrmann | G07F 17/3223 463/25 |
| 2010/0146443 A1* | 6/2010 | Zuckerberg | G06F 16/9535 715/810 |
| 2011/0029612 A1* | 2/2011 | Bosworth | G06F 16/958 709/204 |
| 2011/0212767 A1* | 9/2011 | Barclay | G07F 17/3225 463/25 |
| 2011/0246907 A1* | 10/2011 | Wang | G06F 3/0481 709/224 |
| 2012/0036080 A1* | 2/2012 | Singer | G06Q 10/10 706/46 |
| 2012/0041907 A1* | 2/2012 | Wang | G06Q 30/02 706/12 |
| 2012/0066196 A1* | 3/2012 | Dempski | G06F 17/30864 707/706 |
| 2012/0072428 A1* | 3/2012 | Kao | G06Q 10/00 707/748 |
| 2012/0150772 A1* | 6/2012 | Paek | G06N 5/025 706/46 |
| 2012/0158455 A1* | 6/2012 | Pathak | G06Q 30/0201 705/7.29 |
| 2012/0197993 A1* | 8/2012 | Skomoroch | G06Q 30/02 709/204 |
| 2012/0203838 A1 | 8/2012 | Zuckerberg et al. | |
| 2012/0215903 A1* | 8/2012 | Fleischman | G06Q 50/01 709/224 |
| 2012/0233009 A1* | 9/2012 | Fougner | G06Q 50/01 705/26.3 |
| 2012/0246576 A1* | 9/2012 | Baldwin | G06Q 10/10 715/751 |
| 2012/0290637 A1* | 11/2012 | Perantatos | G06Q 10/10 709/203 |
| 2012/0296731 A1* | 11/2012 | Ross | G06Q 30/0279 705/14.36 |
| 2012/0324007 A1* | 12/2012 | Werz, III | G06Q 10/10 709/204 |
| 2013/0005478 A1* | 1/2013 | McCaffery | A63F 13/87 463/42 |
| 2013/0013691 A1 | 1/2013 | Whitnah et al. | |
| 2013/0030905 A1 | 1/2013 | Fuloria et al. | |
| 2013/0031034 A1 | 1/2013 | Gubin et al. | |
| 2013/0031489 A1 | 1/2013 | Gubin et al. | |
| 2013/0036169 A1* | 2/2013 | Quigley | G06Q 50/01 709/204 |
| 2013/0066673 A1* | 3/2013 | Rose | G06F 16/958 705/7.28 |
| 2013/0103624 A1 | 4/2013 | Thieberger | |
| 2013/0117284 A1* | 5/2013 | Roozen | G06F 16/95 707/748 |
| 2013/0179925 A1* | 7/2013 | Woods | H04N 21/4222 725/42 |
| 2013/0212495 A1 | 8/2013 | Zuckerberg et al. | |
| 2013/0254283 A1* | 9/2013 | Garcia-Martinez | G06Q 50/01 709/204 |
| 2013/0290349 A1* | 10/2013 | Galvin, Jr. | G06F 16/335 707/749 |
| 2013/0290414 A1* | 10/2013 | Rait | G06Q 50/01 709/204 |
| 2013/0325948 A1* | 12/2013 | Chen | H04L 51/32 709/204 |
| 2014/0012619 A1 | 1/2014 | Natarajan et al. | |
| 2014/0082505 A1* | 3/2014 | Watson | G06F 3/0484 715/738 |
| 2014/0156566 A1* | 6/2014 | Kabiljo | G06N 20/00 706/12 |

OTHER PUBLICATIONS

United States Office Action, U.S. Appl. No. 13/715,999, filed Sep. 3, 2014, 16 pages.

* cited by examiner

ARRANGING STORIES ON NEWSFEEDS BASED ON EXPECTED VALUE SCORING ON A SOCIAL NETWORKING SYSTEM

CROSS-REFERENCE TO RELATED APPLICATION

This application is a continuation application of U.S. patent application Ser. No. 13/715,999, filed Dec. 14, 2012, which is incorporated by reference herein its entirety.

BACKGROUND

This invention relates generally to social networking systems, and more particularly to ranking and ordering stories presented to a social networking system user.

Social networking systems have become increasingly prevalent in recent years, and allow users to more easily communicate with one another. Users of a social networking system associate with other social networking system users, forming a web of connections. Additionally, users may share personal information and other stories with other users connected to them via a social networking system. Examples of information shared by social networking system users include contact information, background information, job information, interests, photos, notes, and/or other member-specific data.

Social networking systems often include a story shared by a user in a newsfeed of stories presented to other users connected to the user. A newsfeed typically includes set of stories selected from recently shared stories. Often, a social networking system users attributes of the user sharing the story and the user being presented with the newsfeed, as well as information about the content of the story, so that stories in the newsfeed are likely to be of interest to the user being presented with the newsfeed.

Many social networking systems include a system for selecting candidate stories for the newsfeed and for determining an order in which candidate stories appear in the newsfeed. Stories are frequently selected for inclusion in a newsfeed because they are likely to be of interest to the user viewing the newsfeed. This encourages the user viewing the newsfeed to continue using the social networking system. For example, a user viewing a newsfeed (a "viewing user") may be more interested in stories relating to a specific user to which the viewing user is connected than in stories relating to other uses with which the viewing user rarely interacts. The social networking system often analyzes various factors, such as user history, story attributes, and user connections, to determine the candidate stories and their rankings for a newsfeed. Presenting stories in which a user is likely to have an interest in a newsfeed encourages additional use of a social networking system by users viewing the newsfeed.

SUMMARY

A social networking system allows its users to quickly review a summary of recent stories submitted by other users through a newsfeed that is uniquely generated for each viewing user. For example, stories may be included on the newsfeed on the basis of the quality of connection between a user sharing a story and the viewing user, the type of story, or the story content. Because newsfeeds are often the initial content presented to users by a social networking system, stories most likely to be of interest to a user are frequently included in the newsfeed presented to the user.

To select stories for inclusion in a newsfeed and to order stories included in a newsfeed, a social networking system determines an expected value score for various candidate stories. The expected value score is based on the probability of the user viewing the newsfeed (a "viewing user") performing different types of interactions with a candidate story and the values of different types of actions to the social networking system. Previous interactions between the viewing user and stories having similar attributes to candidate stories are analyzed to determine the probability of the viewing user performing different types of interactions with a candidate story. A numerical value is associated with different types of interaction by the social networking system to represent the value of a type of interaction to the social networking system. For example, comments may be more valuable to the social networking system than sharing a story, so an interaction type of "comment" has a higher numerical value than an interaction type of "share."

Based on the probability of a viewing user performing different types of interactions with a candidate story and the numerical values associated with different types of interactions, the social networking system generates an expected value score for the candidate story. Based on expected value scores for candidate stories, the social networking system ranks the candidate stories. From the ranking, the social networking system selects candidate stories for inclusion in the newsfeed presented to the viewing user. Using expected value scores, the newsfeed may include stories with which the viewing user is more likely to interact. Alternatively using expected value scores allows the social networking system to modify the ordering and selection of stories for a newsfeed to increase the likelihood of the viewing user performing certain types of interactions.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
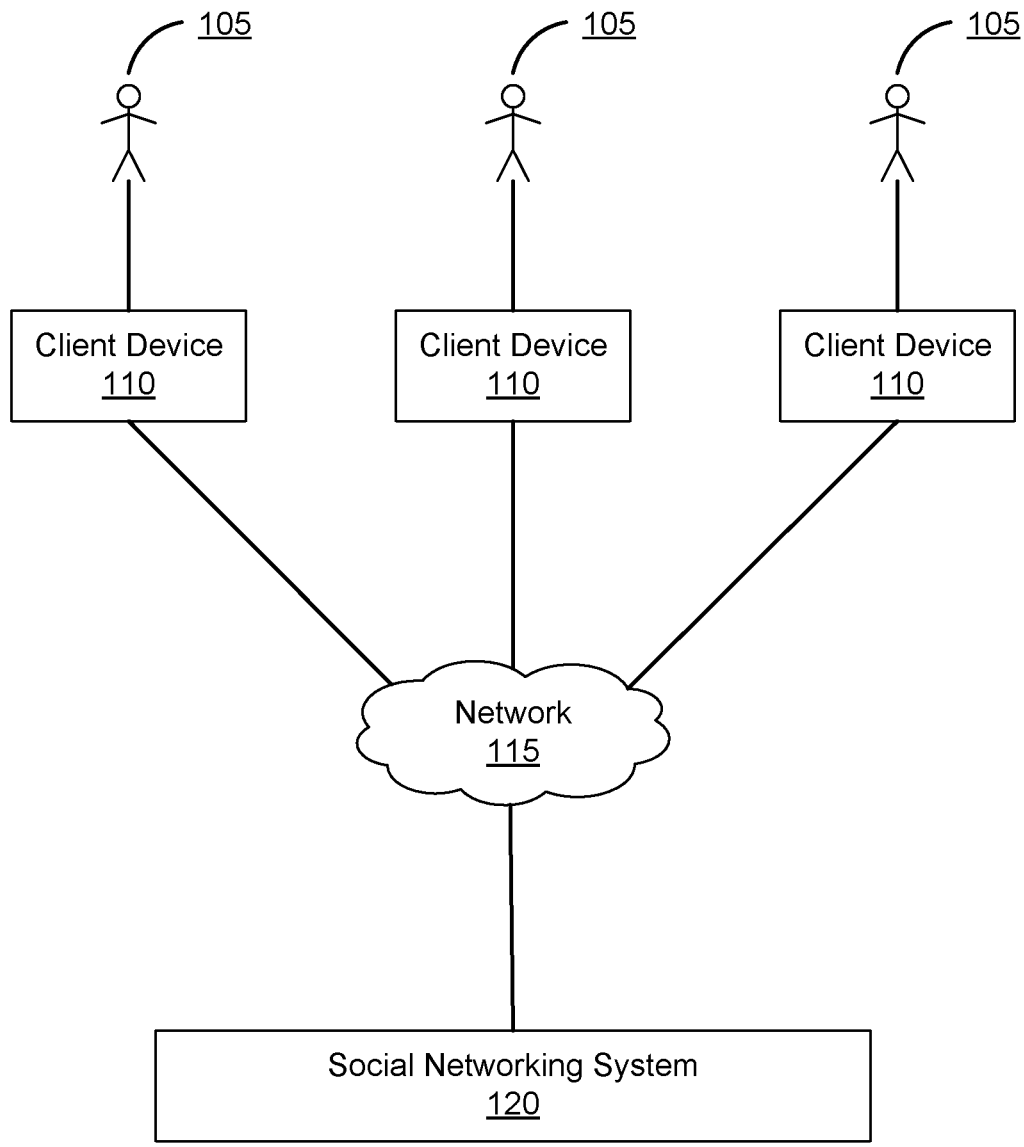
FIG. 1 is a block diagram of a system environment for sharing user stories and selecting candidate stories for arrangement on a newsfeed, in accordance with an embodiment.

FIG. 1 is a block diagram of one embodiment of a system environment 100 in which a social networking system operates. System environment 100 includes one or more users 105 using client devices 110, network 115, and social networking system 120. For purposes of illustration, system environment 100 shown by FIG. 1 includes three clients 105 each using a client device 110. System environment 100, however, may include greater than or less than three clients 100.

User 105 is one or more entities that are capable of interacting with client device 110 to exchange data with social networking system 120 via network 115. However, user 105 is not constrained to being an individual. For example, user 105 may also be a group of individuals, an organization, a company, or any other entity.

Client device 110 comprises one or more computing devices capable of processing data as well as transmitting and receiving data via network 115. For example, client device 115 may be a desktop computer, a laptop computer, a smart phone, a tablet computing device, or any other device having computing and data communication capabilities. Network 115 may comprise any combination of local area, cellular, wireless, and/or terrestrial communication systems.

Social networking system 120 comprises one or more computing devices that store information on a plurality of users, objects and connections between users and/or objects. Social networking system 120 provides various functionalities allowing its users to interact with each other. Social networking system 120 is further described below in conjunction with FIG. 2.

In use, users join social networking system 120 and add connections to other users of social networking system 120. These connections often, but not necessarily, reflect connections that exist outside of the social networking system 120, or "offline" relationships between users 105. A social networking system users to which another user is connected may be referred to as a "friend," a "connection," or an "associate." Frequently, a user receives stories via social networking system 120 describing actions or content associated with other social networking system users connected to the user.

Users on social networking system 120 may explicitly add or remove connections between themselves and other users and/or objects. In addition, some connections may be automatically created based on common characteristics between users or between users and objects. For example, social networking system 120 may create connections between users from the same educational institution or associated with the same organization. Connections on social networking system 120 are often, but not necessarily, mutual; hence, since some connections may be unilateral. For example, user A and user B are both users of social networking system 120 and connected to each other; thus, user A and use B have a bilateral connection where each user may see information shared by the other user. However, user A establishes a connection with user C, while user C does not establish a connection to user A. Accordingly, a unilateral connection is formed between user A and user C. Because of the unilateral connection, limited information may be shared between user A and user C. Although connections between users are often direct, some connections may be indirect, with indirectly connected users separated by one or more degrees of separation.

Social networking system 120 allows users to post and share stories relating to themselves or their activities. A story may be presented to other users connected to a user posting or sharing the story, enhancing user interactions with social networking system 120. User-generated stories may include any data a user may add, upload, send, transmit, or "post," to social networking system 120. For example, a user uploads a post to social networking system 120 from client device 110. The post may include textual data (e.g. comments, status updates, notes, or links), geographic location information, photos, videos, links, music, or other data and/or media. As used herein, a "story" refers to any information a user provides to social networking system 120 that is accessible by one or more additional users. For example, a notification about a change in a user's choice of language used by social networking system 120, if shared with other users, is a story. Hence, a story may include information that a user does not manually specify. Often, stories are shared with other users connected to a user associated with the story; however, in some embodiments, a story may be accessible to any social networking system user.

Stories received from social networking system users may be stored by social networking system 120. While users may access stories associated with other users connected to the user, social networking system 120 generates a newsfeed including selected stories for presentation to users. A newsfeed includes stories posted, or otherwise associated with, users to which the user viewing the newsfeed (a "viewing user") is connected. Generating a newsfeed for a viewing user allows the newsfeed to account for differences in users connected to different viewing users and differences in other characteristics or preferences between different viewing users. Additionally, by selecting stories likely to be of interest to a viewing user and including those stories in a newsfeed generated for the viewing user, social networking system 120 increases the likelihood that the viewing user further interacts with social networking system 120. This allows social networking system 120 to obtain additional information about the viewing user.

Social Networking System Architecture

Figure 2:
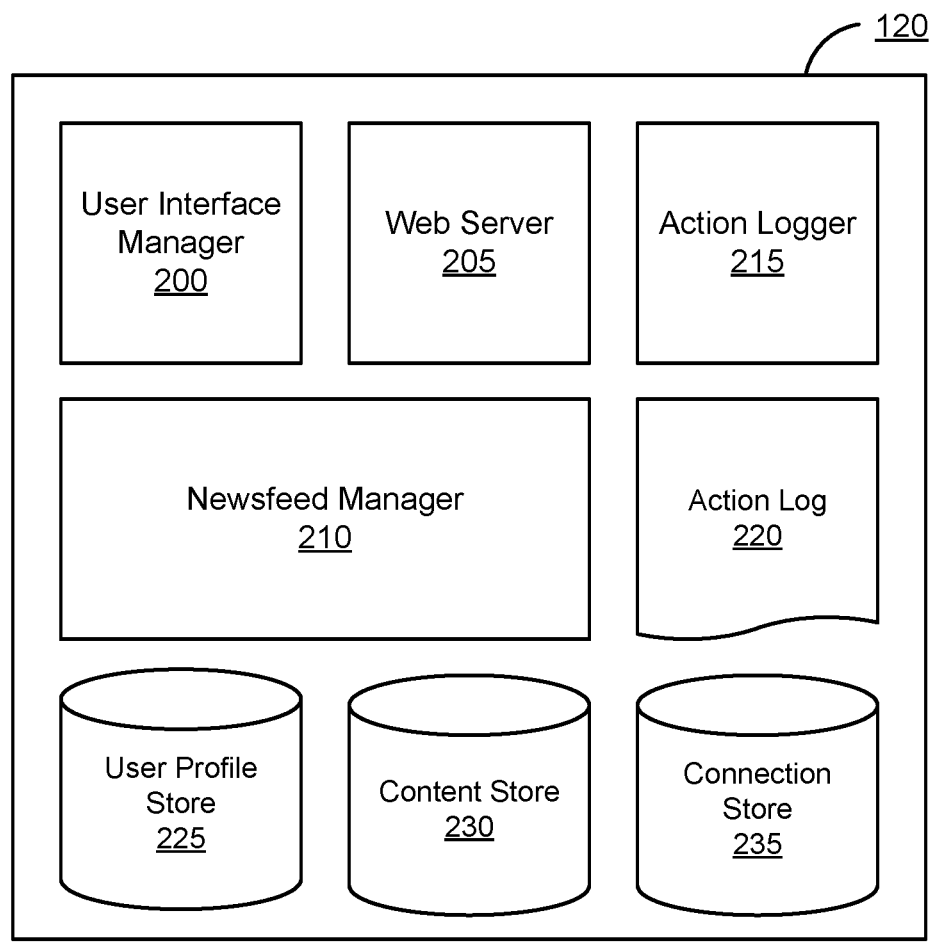
FIG. 2 is a block diagram of a social networking system for structuring newsfeed based on the ranks of candidate stories, in accordance with an embodiment.

FIG. 2 is a diagram of one embodiment of social networking system 120. The example of social networking system 120 shown by FIG. 2 includes user interface manager 200, web server 205, newsfeed manager 210, action logger 215, action log 220, user profile store 225, content store 230, and edge store 235. However, other embodiments may include additional, fewer, or different modules for various applications. In addition, conventional components, such as network interfaces, security mechanisms, failsafe servers, management consoles, and other modules, are not shown in the figure so as to not obscure the details of the system.

Web server 205 communicates data between social networking system 12 and one or more client devices 110 via network 115. Web server 205 receives commands from users via client devices 110 and network 115 and communicates the commands to components of social networking system 120. Additionally, components of social networking system 120 provide data to web server 205, which communicates the data to client devices 110 based on user identification information in the data. For example, when a user requests a data connection to social networking system 120 via network 115, web server 205 receives the request and establishes the data connection via network 115; web server 205 also communicates the request to one or more additional components, which provide data to the web server 205 for transmission to the requesting user via network 115.

User interface manager 200 processes data from other components of social networking system 120 and generates an interface from the processed data. The interface is communicated to client devices 110, allowing users to interact with data maintained by social networking system 120 by providing information to the interface. For example, users access icons, stories or other content presented by the interface, and information describing the user accesses is communicated to social networking system 120 for storage. In one embodiment, user interface manager 200 determines the interactions between the client device 110 and users via the interface, and processes the received information into formats used by other components of social networking system 120.

Social networking system 120 maintains a user profile for each of its users and stores these user profiles in user profile store 225. A user profile includes information about the user that the user has provided to social networking system 120, such as biographic, demographic, work experience, educational history, gender, hobbies or preferences, location and the like. However, user profiles may also include profile information that is inferred by social networking system 120, such as possible connections or interests. In one example, a user profile includes a plurality of data fields, each describing one or more attributes about a corresponding social networking system user. A user profile may also store other information provided by the user, such as images, videos, comments, and other stories that the user has been identified or "tagged" on. A user profile stored in user profile store 225 may also include links to content stored in content store 230, edge store 245, and/or action log 220 that is related to the user.

Social networking system 120 also stores objects, including stories associated with users, in content store 230. Stories provided, either publically or privately, to social networking system 120 by users, are stored in content store 230. As used herein "stories" may include any type of comments, notes, status updates, links, videos, pictures and the like. Other objects maintained by social networking system 120, such as events, pages, and applications, are included in content store 230. Social networking system 120 retrieves objects and presents the retrieved objects to users via an interface or other suitable communication channel.

Edge store 235 stores the information describing connections between users and other objects on social networking system 120 as edges. Some connections may be defined by users, allowing users to specify their relationships with other users. For example, users may generate edges with other users that parallel the users' real-life relationships, such as friends, co-workers, partners, and so forth. Other connections are generated when users interact with objects in social networking system 120, such as expressing interest in a page on the social networking system, sharing a link with other users of the social networking system, and commenting on posts made by other users of the social networking system. Edge store 235 may also record the changes in user connections over time. For example, when user A defines user B as a friend and user B reciprocates, edge store 235 will identify user A and user B as "friends" on the social networking system 120. In addition, connection store 235 may record the time and other information associated with an edge, such as an application or process used to create the connection. In some embodiments, connections between users may be stored in user profile store 225, content store 230 or either of those stores may access edge store 235 to determine connections between users and other users or objects.

Information describing edges is also stored in edge store 235, such as affinity scores for objects, interests, and other users. Affinity scores may be computed by social networking system 120 over time to approximate a user's affinity for an object, interest, and other users in social networking system 120 based on the actions performed by the user. A user's affinity may be computed by social networking system 120 over time to approximate a user's affinity for an object, interest, and other users of social networking system 120 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge object in edge store 235, in one embodiment.

Action logger 215 receives information about user actions on social networking system 120, as well as actions performed outside of social networking system 120, and records this information in action log 220. Examples of actions include: adding a connection to another user, sending a message to another user, uploading an image, reading a message from another user, viewing content associated with another user, attending an event posted by another user, among others. In addition, a number of actions described in connection with other objects are directed at particular users, so these actions are associated with those users as well. These actions are stored in the action log 220.

Action log 220 may be used by social networking system 120 to track user actions on social networking system 120, as well as on external websites that communicate information to social networking system 120. Users may interact with various objects on social networking system 120, including commenting on posts, sharing links, and checking-in to physical locations via a mobile device, accessing content items or other interactions. Information describing these actions is stored in action log 220. Additional examples of interactions with objects on social networking system 120 included in action log 220 include commenting on a photo album, transmitting communication between users, becoming a fan of a musician, adding an event to a calendar, joining a groups, becoming a fan of a brand page, creating an event, authorizing an application, using an application and engaging in a transaction. Additionally, action log 220 records a user's interactions with advertisements on social networking system 120 as well as other applications operating on social networking system 120. In some embodiments, data from action log 220 is used to infer interests or preferences of the user, augmenting the interests included in the user profile and allowing a more complete understanding of user preferences.

Action log 220 may also store user actions taken on external websites. For example, an e-commerce website that primarily sells sporting equipment at bargain prices may recognize a user of social networking system 120 through social plug-ins that enable the e-commerce website to identify the user of social networking system 120. Because users of social networking system 120 are uniquely identifiable, e-commerce websites, such as this sporting equipment retailer, may use the information about these users as they visit their websites. Action log 220 records data about these users, including webpage viewing histories, advertisements that were engaged, purchases made, and other patterns from shopping and buying.

Social networking system 120 identifies stores likely to be of interest to a user through a "newsfeed" presented to the user. Newsfeed manager 210 selects candidate stories from content store 230 and analyzes the candidate stories to select stores included in a newsfeed. Information from additional components of social networking system 120, such as user profile store 225, edge store 235, and action log 220, is also retrieved and used by newsfeed manger 210 to generate a newsfeed personalized for a user of social networking system 120.

For example, newsfeed manager 210 receives an instruction identifying a user accessing social networking system 120 from web server 205. Newsfeed manager 210 accesses one or more of user profile store 225, content store 230, edge store 235, action log 220, or other suitable sources and retrieves information about the identified user as well as stories or other data. For example, stories or other data associated with users connected to the identified user are retrieved. The retrieved stories and other data are filtered by newsfeed manager 210 to identify content likely to be relevant to the identified user. For example, stories associated with users not connected to the identified user are not identified as candidate stories or stories associated with users to which the identified user has less than a threshold affinity are not identified as candidate stories. In one embodiment, newsfeed manager 210 may identify stories associated with users to which the identified user is inferentially connected, such as stories associated with users connected to an additional user that is connected to the identified user, as candidate stories. For example, newsfeed manager 210 selects stories communicated between two users connected to the identified user as candidate stories. Various methods are used to identify candidate stories for inclusion in a newsfeed and to order candidate stories include in the newsfeed, and are further described below in conjunction with FIGS. 3-5.

In various embodiments, a newsfeed is a dynamic list that may include a complete listing of candidate stories or may include a limited number of candidate stories. The number of stories included in a newsfeed may be determined in part by a user preference included in user profile store 225. As described above, newsfeed manager 210 identifies stories for presentation through a newsfeed as well as the order in which identified stories are presented by the newsfeed. For example, newsfeed manager 210 determines that a user has a highest affinity for a specific user and increases the number of stories in the newsfeed associated with the specific user. Newsfeed manager 210 may also account for actions by a user that indicate preferences for types of stories and selects stories having the same, or similar, types for inclusion in the newsfeed. Additionally, newsfeed manager 210 may analyze stories received by social networking system 120 from various users and obtains information about user preferences or actions from the analyzed stories. This information may be used to refine selection of stories for newsfeeds presented to various users.

Increasing Ranking of Stories Associated with Certain Users

While presenting users with stories associated with other users to which they are connected in a newsfeed is sufficient for many social networking system users, newsfeeds generated for users satisfying certain criteria may be modified to enhance interactions between the users and social networking system 120, Examples of criteria for modifying a user's newsfeed include: sharing less than a threshold number of stories, providing less than a threshold amount of feedback on stories, having less than a threshold number of connections to other users, having established an account with social networking system 120 within a threshold time from a current time, or other suitable criteria. A user satisfying one or more of these criteria may be referred to as a "needy user." To increase engagement between a needy user and social networking system 120, stories provided by a needy user may be made more visible to other social networking system 120, which may increase communication between the needy user and other social networking system users. For example, when ranking candidate stories for inclusion in a newsfeed, newsfeed manager 210 may increase the ranking of stories associated with a needy user, which increases the likelihood that stories associated with the needy user are included in a newsfeed. This increased exposure of other users to stories associated with the needy user increases the likelihood that the other users interact with the needy user.

Figure 3:
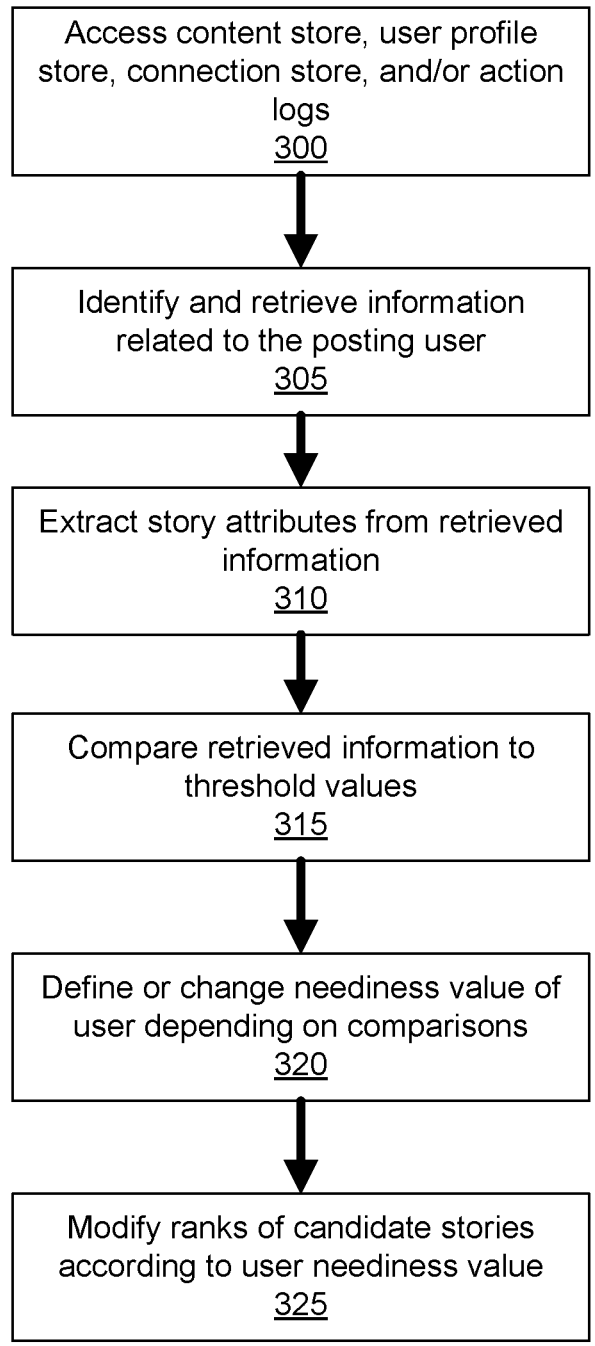
FIG. 3 is a flow chart of a method for ranking candidate stories where a ranking of stories associated with certain users is increased, in accordance with an embodiment.

FIG. 3 illustrates an embodiment of a method for ranking candidate stories for a newsfeed, where a ranking of stories associated with certain users is increased. When newsfeed manager 210 receives a request from a user of social networking system 120 to view a newsfeed (a "viewing user"), newsfeed manager accesses 300 user profile store 225, content store 230, edge store 235, and action log 220. Data from the accessed sources is analyzed to select candidate stories for presentation to the viewing user. For example, candidate stories from content store 230 associated with other users connected to the viewing user are selected as candidate stories for presentation to the viewing user. Methods for analyzing stories to identify candidate stories for the viewing user include extracting story attributes, analyzing possible tags or indices that may be assigned to each story, determining whether the story was shared by the user or any one of the users connected to the viewing user connections, determining whether the story reflects the viewing user's interests and so forth. For example, newsfeed manager 210 determines that stories shared by the viewing user or users connected to the viewing user are selected as candidate stories. As another example, newsfeed manager 210 selects candidate stories based on user interactions with stories, such as comments or other feedback, as well as one or more selection criteria.

After identifying candidate stories, newsfeed manager 210 retrieves 305 information related to the users associated with the candidate stories. For example, information user profile store 225, content store 230, edge store 235, and action log 220 associated with each user associated with a candidate story is retrieved. Attributes of the user associated with a candidate story are extracted 310 from the retrieved information to determine if the user associated with the candidate story is a needy user. For example, newsfeed manager extracts 310 information describing: an amount of feedback associated with the candidate story, types of feedback received by the candidate story (e.g., likes, clicks, comments, shares, hides and so forth) from other users, a number of stories associated with the user associated with the candidate stories, a rate at which the user associated with the candidate story provides stories to social networking system 120, a number of social networking system users connected to the user associated with the candidate story, or any other suitable information. Additional information that may be extracted 310 includes story content, types of connections between the user associated with a candidate story and other users, inferences of interests of the user associated with the candidate story based on the candidate story content, or other information.

Newsfeed manager 210 compares 315 the extracted information to one or more threshold values. These threshold values may be initially defined by the operators of the social networking system 120 or may be defined by one or more modules of social networking system 120. In some embodiments, the threshold values may be dynamically modified over time. The threshold values define values for determining whether the user associated with the candidate story is a needy user. For example, a user connected to less than a threshold number of other users is determined to be a needy user. As another example, if the user performs less than a threshold amount of activity with social networking system 120, the user is determined to be a needy user.

Based on comparison of attributes of a user associated with a candidate story, newsfeed manager 210 defines 320 a neediness value for the user associated with the candidate story. For example, if a user posts 3 stories per month but the threshold for neediness is 6 posts per month, then the user would be identified as a "needy user," and a neediness value associated with the user is defined 320. In one embodiment, the neediness value is a binary value indicating whether or not a user is a needy user. Alternatively, the neediness value may have a range of values depending on differences between user attributes and threshold values; for example, a neediness value may be proportional to the difference between a user attribute and a threshold value.

A neediness value defined 320 for a user may be modified as attributes of the user change over time For example, when a user begins using social networking system 120, the user may be defined by newsfeed manager 210 as having a high neediness value. However, as the user interacts with social networking system 120 more, newsfeed manager 210 changes the neediness value of the user based on the increased interaction between the user and social networking system 120.

Each user associated with a candidate story is associated with a neediness value, so newsfeed manager 210 modifies 325 the ranking of candidate stories based on the neediness value of a user associated with a candidate story. If a user has a high neediness value, then newsfeed manager 210, the ranking of a candidate story associated with the user is modified 325 to increase its ranking relative to candidate stories associated with users having lower neediness values. Because the ranking of a candidate story determines whether the candidate story is selected for a newsfeed and its location in the newsfeed if selected, this modification increases the likelihood that the candidate story associated with the user having the high neediness value is included in the newsfeed for the viewing user. As neediness values may change over time, newsfeed manager 210 may change the ranking of candidate stories as the neediness value of the user associated with the candidate story changes over time. In one embodiment, the amount by which a candidate story's ranking is increased is based on the neediness value of the user associated with the candidate story; hence, candidate stories associated with users having high neediness values may have a greater ranking increase than candidate stories associated with users having lower neediness values. Hence, accounting for neediness values of various users allows social networking system 120 to aid certain users by making the users' stories more prominent in newsfeeds to other users. This may increase user interaction with social networking system 120 or allow users to more easily establish connections with other users or provide content to other users.

Systems other than social networking system 120 may also account for user factors, such as user neediness, when providing content to other users. For example users of an online gaming system play various games offered by the gaming system, generating a stream of scores or achievements within the games. To create an incentive for users to continue gaming, the online gaming system may share user activities and achievements with other users. In selecting user activities for sharing, the online gaming system ranks the activities or achievements. However, activities or achievements of users that infrequently interact with the online gaming system may be less likely to be presented to additional users. By determining a neediness value for different users, based on user interactions relative to threshold values, the online gaming system may increase the likelihood that information about infrequent users is distributed to other users.

Selecting Stories Based on Expected Value

Certain stories stored by social networking system 120 are more interesting to a viewing user than others. Further, a viewing user may be more likely to interact with certain types of stories than other types of stories. Examples of interactions with a story include: viewing the story, expressing a preference for the story ("liking" the story), accessing the story, providing a comment associated with the story, accessing the story, and sharing the story with another user. To increase the likelihood that the viewing user's newsfeed includes stories in which the viewing user is likely to be interested or with which the viewing user is likely to interact, newsfeed manger 210 may determine an expected value for candidate stories and rank the candidate stories based on their expected values.

Newsfeed manager 210 assigns a value to each type of interaction between a user and a candidate story and determines an expected value score for the candidate story based on the probabilities of different types of interactions occurring and the values assigned to the different types of interactions. For example, newsfeed manager determines a product of a type of interaction and a probability of a viewing user performing the type of interaction with a candidate story for multiple types of actions and sums the products to determine the expected value score of the candidate story. An expected value score may be calculated for each type of candidate story or for each candidate story, and the expected value scores are used to rank candidate stories for inclusion in a newsfeed.

Figure 4:
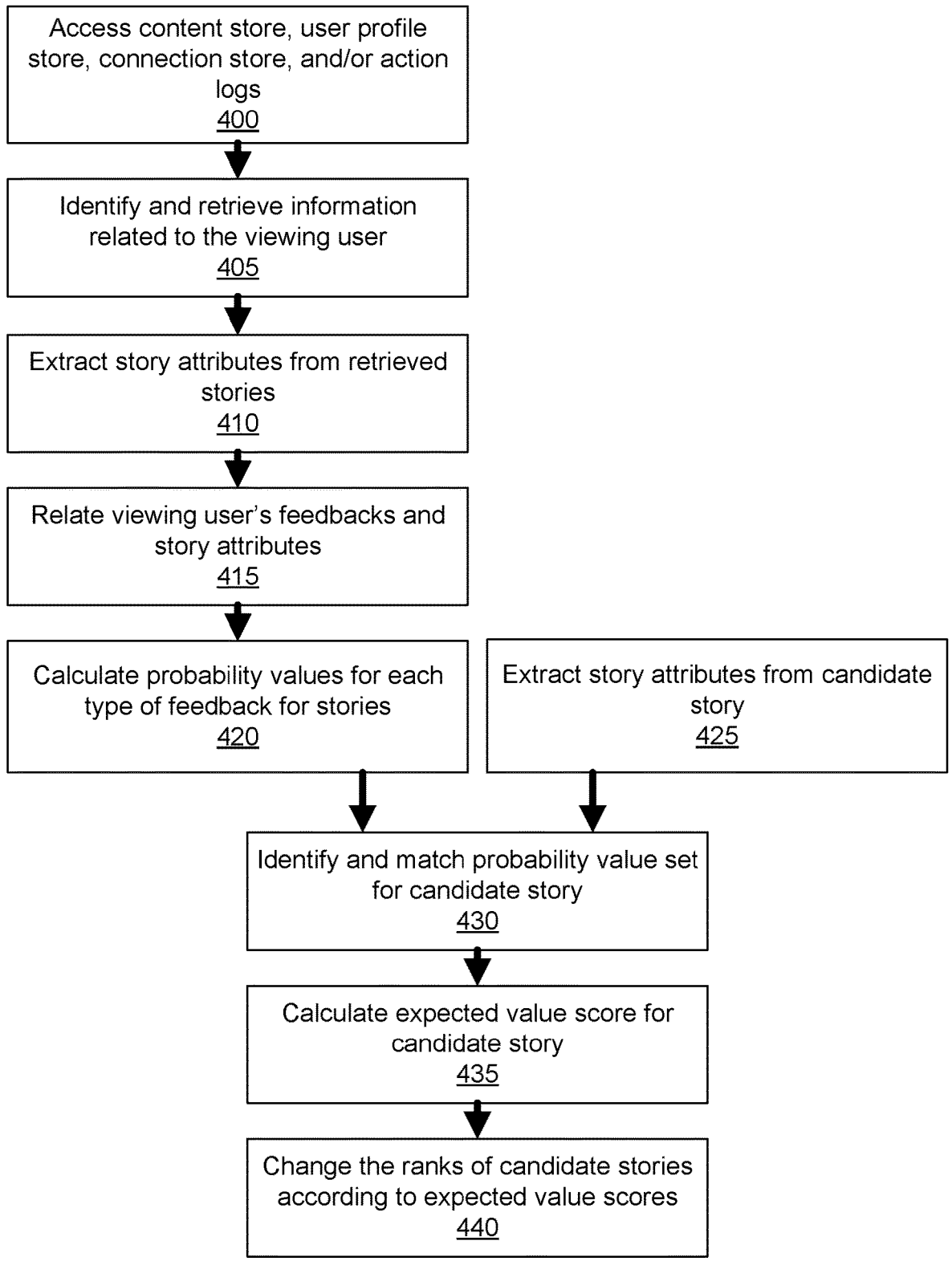
FIG. 4 is a flow chart of a method for ranking candidate stories based on expected values, in accordance with an embodiment.

FIG. 4 is a flow chart of one embodiment of a method for ranking candidate stories for a newsfeed based on expected values of the candidate stories. When newsfeed manager 210 receives a request from a user of social networking system 120 to view a newsfeed (a "viewing user"), newsfeed manager accesses 400 one or more of user profile store 225, content store 230, edge store 235, and action log 220 to retrieve 405 information describing prior interactions with social networking system 120 by the viewing user. For example, data describing characteristics of the viewing user, stories with which the viewing user interacted, types of interactions with stories by the viewing user, users connected to the viewing user, and any other suitable information are retrieved 405.

In one embodiment, newsfeed manager 210 retrieves stories with which the viewing user previously interacted based on information in action log 220 and content store 230. Based on information in action log 220, newsfeed manager 210 determines a type associated with each of the previous interactions between the viewing user and a story. Examples of types of interactions include: viewing a story, expressing a preference for the story ("liking" the story), accessing the story, providing a comment associated with the story, accessing the story, and sharing the story with another user. Newsfeed manager 210 may also identify and retrieve other stories associated with the user, such as stories associated with other users connected to the viewing user, to provide additional information for the probability calculations.

After retrieving stories with which the viewing user interacted and data describing the interactions with the retrieved stories, newsfeed manager 210 extracts 410 story attributes from the retrieved stories. Extracting story attributes allows newsfeed manager 210 to associate descriptors with different stories, allowing stories to be compared based on their attributes. Story attributes extracted 410 by newsfeed manager 210 include: story type, story content, and degree of connection between the viewing user and the user that shared the story. For example, newsfeed manager 210 extracts 410 key words from each selected story or repeated words to determine story content and determines the connection between a user associated with the story and the viewing user. As another example, newsfeed manager 210 extracts 410 characteristics of selected candidate story, such as a story type (e.g., a comment, status update, shared link, photo, video, geographical location marker, etc.).

In one embodiment, newsfeed manager 210 relates 415 extracted attributes for a retrieved story with user interactions between the viewing user and the retrieved story obtained from action log 220. Relating story attributes with the user interactions allows newsfeed manager 210 to associate user interactions with attributes of the stories on which the interactions were performed. Alternatively, a retrieved story may be associated with interactions with the retrieved story by social networking system users. Newsfeed manger 210 may match viewing user interactions from action log 220 with a story from content store 230 on which the interaction was performed. Attributes from retrieved stories are associated with a number of interactions and a type of interactions. Data describing numbers of different types of interactions may also be associated with a retrieved story. Associating interactions and types of interactions with story attributes allows newsfeed manager 210 to determine how often the viewing user interacts with stories having different attributes and types of interactions performed by the viewing user on stories with different attributes. For example, newsfeed manager 210 determines that the viewing user accesses photos more frequently than shared links, but more frequently comments on videos. As another example, newsfeed manager 210 determines that the viewing user does not access stories from other users except for event notification stories.

Based on the interactions and types of interactions associated with various story attributes, newsfeed manager 210 calculates 420 probability values for various retrieved stories. In one embodiment, newsfeed manager 210 categorizes retrieved stories into groups based on story attributes such as: story type (e.g. links, photos, videos, events, comments, notes, status updates and so forth), story content (e.g. family, friends, event, emotion, celebration, complaint and so forth), a type of connection between the viewing user and a user associated with the story, the user associated with the story, a time associated with the story, or other suitable attribute or attributes. For each category, newsfeed manager 210 calculates 420 the probability that the viewing user will interact with a story having attributes corresponding tot eh category based on a number of times the user previously interacted with stories from that category compared relative to stories in other categories. For example, newsfeed manager 210 determines that a viewing user interacts with videos more frequently than other types of stories, so stories having a story type of video have a higher probability of user interaction than other types of stories.

In another embodiment, newsfeed manager 210 may calculate 420 the probability that the viewing user performs specific types of interactions with stories having different story attributes. For example, a viewing user may comment on another user's status update more often than the viewing user shares the other user's status update. However, the viewing user may interact with status updates more often than with shared links. In this example, newsfeed manager 210 calculates 420 a higher probability that the viewing user comments on a status updates than shares the status update, and also calculates 420 that the probabilities of commenting or sharing are higher than the probabilities of other types of interactions with shared links.

When the viewing user requests a newsfeed, the newsfeed manager 210 identifies candidate stories, as further described above, and extracts 425 story attributes from each candidate story, as further described above. Based on the story attributes extracted 425 from a candidate story, newsfeed manager 210 associates the candidate story with a category. Newsfeed manager 210 identifies retrieved stories having one or more story attributes similar to, or matching, story attributes of the candidate story. For example, newsfeed manager 210 identifies retrieved stories having at least a threshold number of story attributes matching or similar to story attributes of the candidate story.

Based on story attributes of a candidate story and probability values for retrieved stories in a category with the candidate story, newsfeed manager 210 determines a set of probability values for each candidate story. Based on the viewing user's prior interactions with videos, newsfeed manager 210 determines probabilities that the viewing user performs various types of interactions with a video and stores the probabilities of the viewing user performing different types of interactions with candidate stories that are videos. Hence, the set of probability values for a candidate story includes the probability that the viewing user performs different types of interactions with the candidate story.

Expected value scores are calculated 435 for each candidate story, or for each type of candidate story, based on the set of probabilities associated with the candidate story, or with candidate stories having a type, and numerical values assigned to each type of interaction for a type of story. In one embodiment, expected value scores are calculated 435 by multiplying a probability of the viewing user performing a type of interaction with a candidate story by a numerical value associated with the type of interaction and summing the products for multiple types of interactions. The numerical values associated with types of interactions may be specified by social networking system operators to reflect a value to social networking system 120 of a user performing a type of interaction. For example, comments on a story may be more valuable to social networking system 120 than a viewing user accessing a story, so a higher numerical value is associated with a comment than for a story access. Higher numerical values result in higher expected value scores for the corresponding type of interaction.

Newsfeed manager 210 calculates an expected value score for each candidate story that represents a weighting between the probability that the viewing user performs a type of interaction with a candidate story and the value assigned to different types of interactions by social networking system 120. Based on the expected values of candidate stories, newsfeed manager 210 changes 440 the ranking of candidate stories so the ranking orders candidate stories based on their expected value scores. In one embodiment, candidate stories with higher expected value scores are moved to higher ranking positions while candidate stories with lower expected value scores are moved to lower ranking positions. The ranking of a candidate story determines the priority in which the candidate story is selected for a newsfeed and the position of the candidate story within the newsfeed.

Systems other than social networking system 120 may use expected value of content items when selecting and ordering content for presentation to a user. For example, an online shopping system shows various different products for sale for consumers, but may not present products likely to be purchased to a consumer. By storing information about types of products users have viewed, what types of interactions with viewed products performed by users (e.g. view, comment, rate, buy, recommend and so forth), number of interactions between a user and different products or types of products, the online shopping system may generate expected value scores for different products, as described above. The online shopping system may select products for a user based on the expected value scores to increase the likelihood of user interactions with presented products.

Enforcing Diversity of Selected Stories

Newsfeed manager 210 may occasionally generate newsfeeds including multiple stories having similar content, similar story types (e.g., photos, videos, links, event notifications, status updates and so forth), associated with the same user, or other similar characteristics. Including multiple similar stories in a newsfeed may cause a viewing user to lose interest with the newsfeed. To generate a newsfeed including stories with a broader range of attributes, newsfeed manager 210 may apply one or more criteria when selecting stories for the newsfeed so that stories with similar attributes have different positions in the newsfeed.

Figure 5:
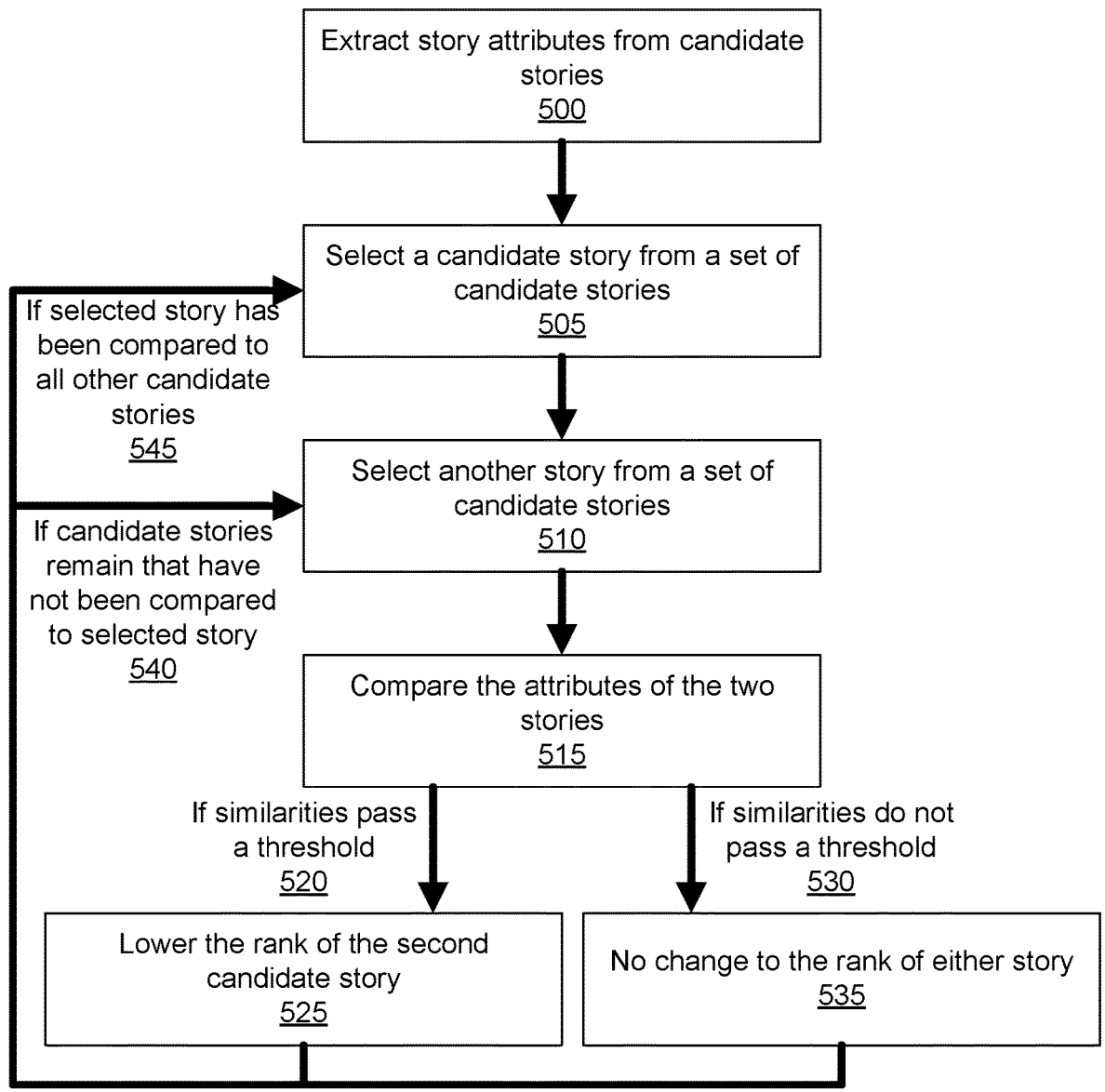
FIG. 5 is a flow chart of a method for ranking candidate stories while enforcing story diversity, in accordance with an embodiment.

FIG. 5 is a flow chart of one embodiment of a method for ranking candidate stories while enforcing story diversity. To enforce story diversity, newsfeed manager 210 changes the rank of candidate stories having at least a threshold number of similar attributes. This modifies the position of the candidate stories within the newsfeed. Newsfeed manager extracts story attributes from candidate stories and compares the story attributes of candidate stories to each other. By comparing story attributes of different candidate stories, newsfeed manager 210 may modify the ranking of candidate stories to decrease the likelihood that a story having at least a threshold number of story attributes matching story attributes of another story is included in the newsfeed or decreases the likelihood that stories having similar, or matching, attributes are presented proximate to each other in a newsfeed.

When newsfeed manger receives a request from a viewing user to generate a newsfeed, newsfeed manager 210 selects a plurality of candidate stories from the content store 230. Candidate stories may be selected based on connections between the viewing user and users associated with the candidate stories or based on any other suitable criteria. As described above, newsfeed manger 210 ranks the candidate stories based on one or more criteria Newsfeed manager 210 extracts 500 story attributes from each candidate story. Examples of story attributes include: the user associated with the story, story content, story type, types of feedback associated with the story, amount of feedback associated with the story, or other suitable criteria. Story attributes may be extracted 500 from information associated with a story, such as time when social networking system 120 received the story, one or more users associated with the story, geographic location, or other information. Other story attributes may be extracted 500 by analyzing story content, such as key words or story type.

A candidate story is selected 505 by newsfeed manager 210, which also selects 510 an additional candidate story is also selected 510. In one embodiment, newsfeed manager 210 initially selects 505 the first candidate story in a list of candidate stories and selects 510 the additional candidate story as the second candidate story in the list of candidate stories. Alternatively, any suitable selection process is used to select 505 the candidate story and to select 510 the additional candidate story.

Newsfeed manager 210 compares 515 story attributes of the candidate story and the additional candidate story to determine similarities between the candidate story and the additional candidate story. Results of the comparison may be stored. For example, newsfeed manager 210 compares 515 the candidate story and the additional candidate story to determine if they are associated with the same user, if they have similar story content, if they have the same, or similar, story types, and/or if similar feedback was received for both candidate stories. Any other suitable story attribute, or combination of story attributes, may be compared 515 between the candidate story and the additional candidate story.

Based on the comparison, newsfeed manager determines if the similarity between the candidate story and the additional candidate story equals or exceeds a threshold level. The threshold level may be set by the social networking system and may differently weight similarities of different story attributes. This weighting allows newsfeed manager 210 to prioritize re-ranking of candidate stories with certain story attributes in common over re-ranking of candidate stories with different story attributes in common. For example, newsfeed manager 210 may re-rank candidate stories to prevent consecutive stories in the newsfeed from being associated with the same user. Hence, candidate stories associated with the same user would exceed the threshold level of similarity more frequently than candidate stories with other matching attributes. Furthermore, the weighting may also include a random variable or value that represents the frequency of a user's posting. In an embodiment, the random variable may be inversely proportional to the posting frequency. Thus, a user that rarely posts may submit a candidate story that receives random variables influencing its weighting during the comparison operation.

Newsfeed manager 210 modifies the ranking of the candidate story and the additional candidate story relative to each other if it determines 520 the similarity between the candidate story and the additional candidate story equals or exceeds a threshold level. In one embodiment, the similarity between the candidate story and the additional candidate story equals or exceeds the threshold level if a threshold number of attributes of the candidate story and of the additional candidate story match. For example, newsfeed manger 210 lowers 525 a rank of the additional story if the similarity between the candidate story and the additional candidate story equals or exceeds the threshold level. Lowering the ranking of the additional story reduces the priority of including the additional story in the newsfeed, likely placing the additional story in a location within the newsfeed that is not proximate to the candidate story. If newsfeed manager 210 determines 530 that the similarity between the candidate story and the additional candidate story is less than the threshold level, the ranking of the candidate story and the additional candidate story relative to each other is not changed 535. In other embodiments, the ranking of the candidate story may be modified, or any other suitable action may be taken, if the similarity between the candidate story and the additional candidate story equals or exceeds a threshold level.

In one embodiment, newsfeed manager 210 present the newsfeed to the viewing user based on the ranking after comparison of the candidate story and the additional candidate story. Alternatively, newsfeed manager 210 compares multiple candidate stories to each other for similarity. For example, newsfeed manager compares each candidate to all other candidate stories. Hence, after comparing the candidate story and the additional candidate story, newsfeed manager 210 selects another pair of stories. If newsfeed manager 210 determines 540 the story has not been compared to all other candidate stories, or to a specified number of candidate stories, newsfeed manager 210 selects 510 another additional story from the set of candidate stories to which the candidate story has not been compared. The candidate story and the other additional candidate story are compared 515 and re-ranked based on the comparison as described above. If the newsfeed manager 120 determines the candidate story has been compared to all other candidate stories, or to a specified number of candidate stories, newsfeed manager 210 selects 505 an alternative candidate story and compares the alternative candidate story to other candidate stories, as described above. In some embodiments, newsfeed manager 210 limits the number of stories included in a newsfeed, or limits the number of candidate stories to reduce computing resources after a specified number of comparisons. Alternatively, as the number of comparisons of candidate stories increases, the threshold level for similarity after a threshold number of comparisons.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a request from a viewing user of an online system for posts associated with a plurality of other users of the online system for presentation on a newsfeed of the viewing user;
selecting candidate posts for the viewing user, the candidate posts posted by one or more other users of the online system;
ranking the candidate posts for presentation on the newsfeed to the viewing user;
determining a neediness value for each other user of the one or more other users associated with the candidate posts, the neediness value for the other user determined by comparing historical interactions with the online system associated with the other user to a set of engagement criteria indicative of an overall level of engagement of the other user with the online system;
identifying, using the determined neediness values, a disengaged user of the one or more other users, the disengaged user having a neediness value above a threshold level indicating a lack of overall engagement of the disengaged user with the online system;
modifying, based on the neediness value of the disengaged user, the ranking of the candidate posts to increase the ranking of the candidate post associated with the disengaged user relative to others of the candidate posts, the modifying increasing the likelihood the candidate post of the disengaged user is viewed by the viewing user on the newsfeed;
selecting a set of the candidate posts based at least in part on the modified ranking; and
sending the selected set of candidate posts for display to the viewing user on the newsfeed.

2. The method of claim 1, wherein the neediness values of the one or more other users are determined using posts posted by the one more other users.

3. The method of claim 1, wherein the historical interactions with the online system include a rate at which the other user provides posts to the online system.

4. The method of claim 1, wherein the historical interactions with the online system include an amount of user feedback received on posts posted by the other user.

5. The method of claim 4, wherein the feedback is selected from a group consisting of: comments on a post, shares of a post, likes of a post, and hides of a post.

6. The method of claim 1, wherein the historical interactions with the online system include an elapsed time between a current time and a time when the other user established an account with the online system.

7. The method of claim 1, wherein determining the neediness value for each other user of the one or more other users comprises:

comparing the historical interactions with the online system associated with the other user to respective threshold interaction levels.

8. The method of claim 7, wherein the neediness value is proportional to a difference between the historical interactions associated with the disengaged user and the threshold interaction levels.

9. The method of claim 7, wherein modifying the ranking of the candidate posts for the viewing user to increase the ranking of the candidate post associated with the disengaged user comprises increasing the ranking of the candidate post associated with the disengaged user by an amount proportional to the neediness value of the disengaged user.

10. The method of claim 9, wherein increasing the ranking of the candidate post associated with the disengaged user further comprises:
    determining that the disengaged user has a higher neediness value than another disengaged user; and
    ranking the candidate post associated with the disengaged user higher than a post of the other disengaged user based on the higher neediness value, the higher ranked post being presented in the newsfeed above the post of the other disengaged user.

11. The method of claim 1, wherein ranking the candidate posts comprises:
    ranking the candidate posts such that candidate posts having higher expected value scores have a higher position in the ranking.

12. A computer program product comprising a non-transitory computer readable storage medium having instructions encoded therein that, when executed by a processor, cause the processor to:
    receive a request from a viewing user of an online system for posts associated with a plurality of other users of the online system for presentation on a newsfeed of the viewing user;
    select candidate posts for the viewing user, the candidate posts posted by one or more other users of the online system;
    rank the candidate posts for presentation on the newsfeed to the viewing user;
    determine a neediness value for each other user of the one or more other users associated with the candidate posts, the neediness value for the other user determined by comparing historical interactions with the online system associated with the other user to a set of engagement criteria indicative of an overall level of engagement of the other user with the online system;
    identify, using the determined neediness values, a disengaged user of the one or more other users, the disengaged user having a neediness value above a threshold level indicating a lack of overall engagement of the disengaged user with the online system;
    modify, based on the neediness value of the disengaged user, the ranking of the candidate posts to increase the ranking of the candidate post associated with the disengaged user relative to others of the candidate posts, the modifying increasing the likelihood the candidate post of the disengaged user is viewed by the viewing user on the newsfeed;
    select a set of the candidate posts based at least in part on the modified ranking; and
    send the selected set of candidate posts for display to the viewing user on the newsfeed.

13. The computer program product of claim 12, wherein the neediness values of the one or more other users are determined using posts posted by the one more other users.

14. The computer program product of claim 12, wherein the historical interactions with the online system include a rate at which the other user provides posts to the online system.

15. The computer program product of claim 12, wherein the historical interactions with the online system include an amount of user feedback received on posts posted by the other user.

16. The computer program product of claim 12, wherein the instructions that cause the processor to identify determine the neediness value for each other user of the one or more other users comprise further instructions that cause the processor to:
    compare the historical interactions with the online system associated with the other user to respective threshold interaction levels.

17. The computer program product of claim 16, wherein the instructions that cause the processor to modify the ranking of the candidate posts for the viewing user to increase the ranking of the candidate post associated with the disengaged user comprise instructions to increase the ranking of the candidate post associated with the disengaged user by an amount proportional to the neediness value of the disengaged user.

18. The computer program product of claim 17, wherein the instructions that cause the processor to increase the ranking of the candidate post associated with the disengaged user further comprise instructions to:
    determine that the disengaged user has a higher neediness value than another disengaged user; and
    ranking the candidate post associated with the disengaged user higher than a post of the other disengaged user based on the higher neediness value, the higher ranked post being presented in the newsfeed above the post of the other disengaged user.

19. The computer program product of claim 16, wherein the neediness value is proportional to a difference between historical interactions associated with the disengaged user and the threshold interaction levels.

20. The computer program product of claim 12, wherein the instructions that cause the processor to rank the candidate posts comprise instructions to:
    rank the candidate posts such that candidate posts having higher expected value scores have a higher position in the ranking.

* * * * *

UNITED STATES PATENT AND TRADEMARK OFFICE
CERTIFICATE OF CORRECTION

| | |
|---|---|
| PATENT NO. | : 11,487,769 B2 |
| APPLICATION NO. | : 15/067134 |
| DATED | : November 1, 2022 |
| INVENTOR(S) | : Yigal Dan Rubinstein et al. |

It is certified that error appears in the above-identified patent and that said Letters Patent is hereby corrected as shown below:

In the Claims

In Column 16, Claim 2, Line 51, delete "one more" and insert -- one or more --, therefor.

In Column 18, Claim 13, Line 10, delete "one more" and insert -- one or more --, therefor.

Signed and Sealed this
Twenty-fourth Day of January, 2023

Katherine Kelly Vidal
*Director of the United States Patent and Trademark Office*